United States Patent
Patkar et al.

(10) Patent No.: US 6,449,671 B1
(45) Date of Patent: Sep. 10, 2002

(54) METHOD AND APPARATUS FOR BUSING DATA ELEMENTS

(75) Inventors: Niteen A. Patkar, Sunnyvale, CA (US); Stephen C. Purcell, Mountain View, CA (US); Shalesh Thusoo, Milpitas, CA (US); Korbin S. Van Dyke, Sunol, CA (US)

(73) Assignee: ATI International Srl (BB)

( * ) Notice: Subject to any disclaimer, the term of this patent is extended or adjusted under 35 U.S.C. 154(b) by 0 days.

(21) Appl. No.: 09/328,971

(22) Filed: Jun. 9, 1999

(51) Int. Cl.⁷ .............................................. G06F 13/00
(52) U.S. Cl. ...................... 710/107; 710/110; 710/112
(58) Field of Search ................................ 710/100, 309, 710/310, 112, 52, 107; 711/141, 144, 105, 150, 146, 121, 143, 145

(56) References Cited

U.S. PATENT DOCUMENTS

| | | | | |
|---|---|---|---|---|
| 5,195,089 A | * | 3/1993 | Sindhu et al. ............... | 370/235 |
| 5,222,224 A | * | 6/1993 | Flynn et al. ................. | 711/120 |
| 5,313,591 A | * | 5/1994 | Averill ........................ | 710/119 |
| 5,701,422 A | * | 12/1997 | Kirkland et al. ............. | 710/112 |
| 5,948,089 A | * | 9/1999 | Wingard et al. ............. | 709/251 |

* cited by examiner

*Primary Examiner*—Rupal Dharia
(74) *Attorney, Agent, or Firm*—Vedder, Price, Kaufman & Kammholz

(57) ABSTRACT

A method and apparatus for busing data elements within a computing system includes processing that begins by providing, on a shared bus, a first control signal relating to a first transaction during a first bus cycle. The processing continues by providing a second control signal relating to a second transaction and a first address signal relating to the first transaction during a second bus cycle. The processing continues by providing a third control signal relating to a third transaction and a second address signal relating to a second transaction during a third bus cycle. The processing then continues by providing a first status relating to the first transaction and a third addressing signal relating to the third transaction during a fourth bus cycle. The processing then continues by providing a second status relating to the second transaction during a fifth bus cycle. The processing then continues by providing first data relating to the first transaction when the first status is a hit and providing third status relating to the third transaction during a sixth bus cycle.

24 Claims, 8 Drawing Sheets

FIG. 6

| | 1st bus cycle | 2nd bus cycle | 3rd bus cycle | 4th bus cycle | 5th bus cycle | 6th bus cycle | 7th bus cycle |
|---|---|---|---|---|---|---|---|
| first transaction | first control signaling | first addr signaling | have data | first status | read data | provide first data | write first data |
| second transaction | | 2nd control signaling | 2nd addr signaling | have data | 2nd status | read data | provide 2nd data |
| third transaction | | | 3rd control signaling | 3rd addr signaling | have data | 3rd status | read data |

FIG. 7

| | 1st bus cycle | 2nd bus cycle | 3rd bus cycle | 4th bus cycle | 5th bus cycle | 6th bus cycle | 7th bus cycle |
|---|---|---|---|---|---|---|---|
| first transaction | first control signaling | first addr signaling | have data | first status | read data (miss) | other transaction | provide 2nd data |
| second transaction | | 2nd control signaling | 2nd addr signaling | have data | 2nd status | read data | provide 2nd data |
| third transaction | | | 3rd control signaling | 3rd addr signaling | have data | 3rd status | read data |

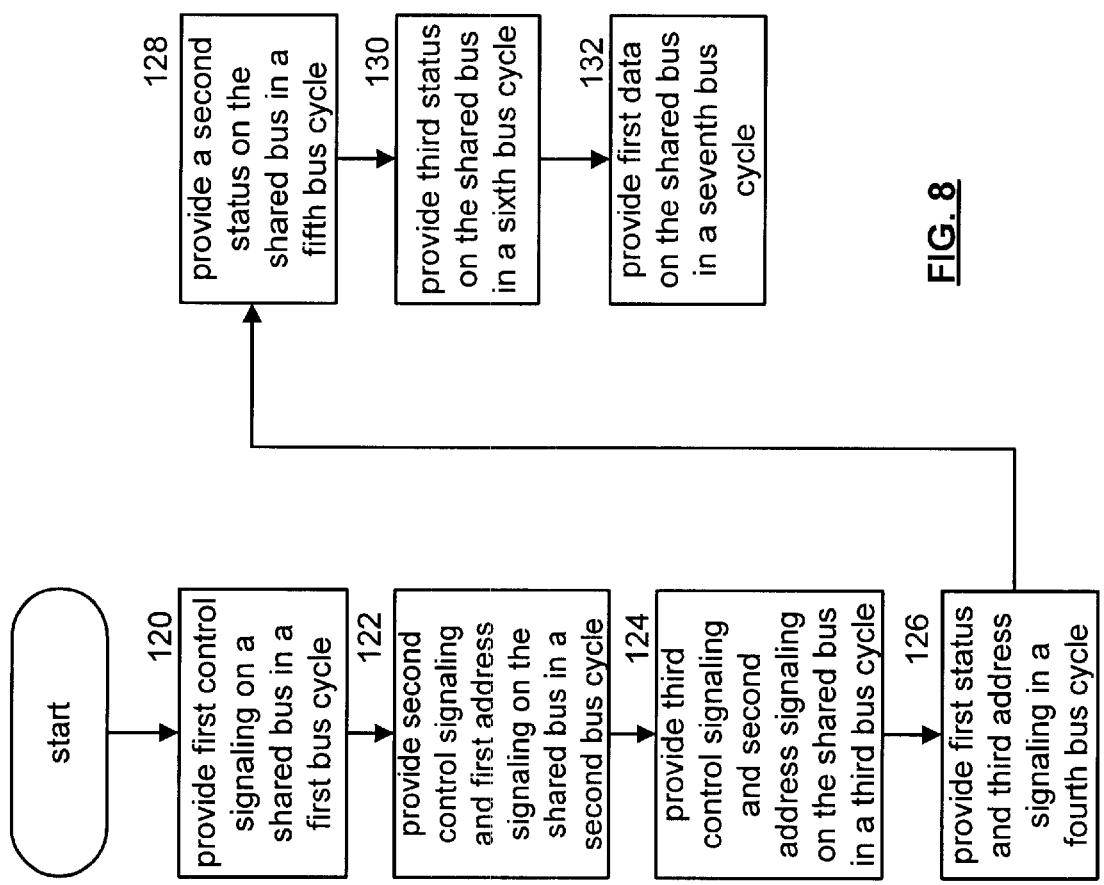

METHOD AND APPARATUS FOR BUSING DATA ELEMENTS

TECHNICAL FIELD OF THE INVENTION

This invention relates generally to computer architectures and more particularly to memory and busing architectures within computers.

BACKGROUND OF THE INVENTION

Computers are known to include a central processing unit, system memory, a memory controller, a chip set, video graphics circuitry, interconnecting buses, and peripheral ports. The peripheral ports enable the central processing unit and/or other components, to communicate with peripheral devices such as monitors, printers, external memory, etc.

In most computer systems, a computer will include cache memory to more effectively access larger memory, such as a system memory hard drive. As is known, cache memory is relatively small in comparison to system memory and can be accessed by the central processing unit much more quickly than the system memory. As such, when the central processing unit has a read and/or write function to process pertaining to a particular data element stored in the system memory, the data element, and related data elements, are retrieved from system memory and provided to the cache memory. As is also known, the related data elements may be in the same memory line (e.g., 128 bytes) as the data element, or in the same memory block (e.g., several memory lines) as the data element.

The rationale for retrieving a line or several lines of memory is based on the assumption that the central processing unit is processing sequentially related operations that have data elements stored in groupings (i.e., in the same memory line or group of memory lines). For example, video graphics data is often stored in a linear or tiled manner, wherein the memory locations correspond to pixel locations of the display. As such, filling the cache with the needed data element and the related data elements requires only one read operation from the system memory, while the central processing unit may perform multiple reads and/or writes of data in the cache. Thus, memory access is much more efficient. Note that the retrieved data elements may be related temporally or spatially.

As is also known, data elements are bused in a pipeline manner wherein, for a given transaction, i.e., a read and/or write of data, the transaction includes an arbitration phase, a request phase, an error phase, a response phase, and a data phase. Each of these phases may be several clock cycles in length and their length varies depending on the busyness of the bus. As such, some data elements may be processed quickly while others are delayed or preempted due to higher priority data traffic. As is known, the error phase is used to determine whether a particular transaction is being preempted for a higher priority transaction. Thus, additional processing is required due to the varying processing lengths of transactions.

In some computer systems, there are multiple processors, where each processor has its own cache, which may include two levels of cache. The first level cache being smaller and more readily accessible than the second level. Thus, in such multiprocessor environments, when a processor is not utilizing its cache, it remains idle. Conversely, when a processor is processing a significant amount of data its cache may be too small, thus forcing the data to be thrashed between cache memory and system memory, which is inefficient. As such, the cache memory in a multiprocessor environment is not used as effectively as possible.

Therefore, a need exists for a method and apparatus that more efficiently utilizes cache memory and more efficiently buses data within a computer system.

BRIEF DESCRIPTION OF THE DRAWINGS

FIG. 6 illustrates a graphical representation of pipelining data elements of several transactions on a bus in accordance with the present invention;

FIG. 7 illustrates a graphical representation of pipeline transaction processing that includes splitting of a transaction in accordance with the present invention;

FIG. 8 illustrates a logic diagram of a method for busing data elements in accordance with the present invention.

DETAILED DESCRIPTION OF A PREFERRED EMBODIMENT

Generally, the present invention provides a method and apparatus for busing data elements within a computing system. Such processing begins by providing, on a shared bus, a first control signal relating to a first transaction during a first bus cycle. The processing continues by providing a second control signal relating to a second transaction and a first address signal relating to the first transaction during a second bus cycle. The processing continues by providing a third control signal relating to a third transaction and a second address signal relating to a second transaction during a third bus cycle. The processing then continues by providing a first status relating to the first transaction and a third addressing signal relating to the third transaction during a fourth bus cycle. The processing then continues by providing a second status relating to the second transaction during a fifth bus cycle. The processing then continues by providing first data relating to the first transaction when the first status is a hit and providing third status relating to the third transaction during a sixth bus cycle. With such a method and apparatus, a high bandwidth, low latency pipelined, split transaction, and fixed latency bus is achieved thereby allowing data elements to be more efficiently transported within a computing system.

Figure 1:
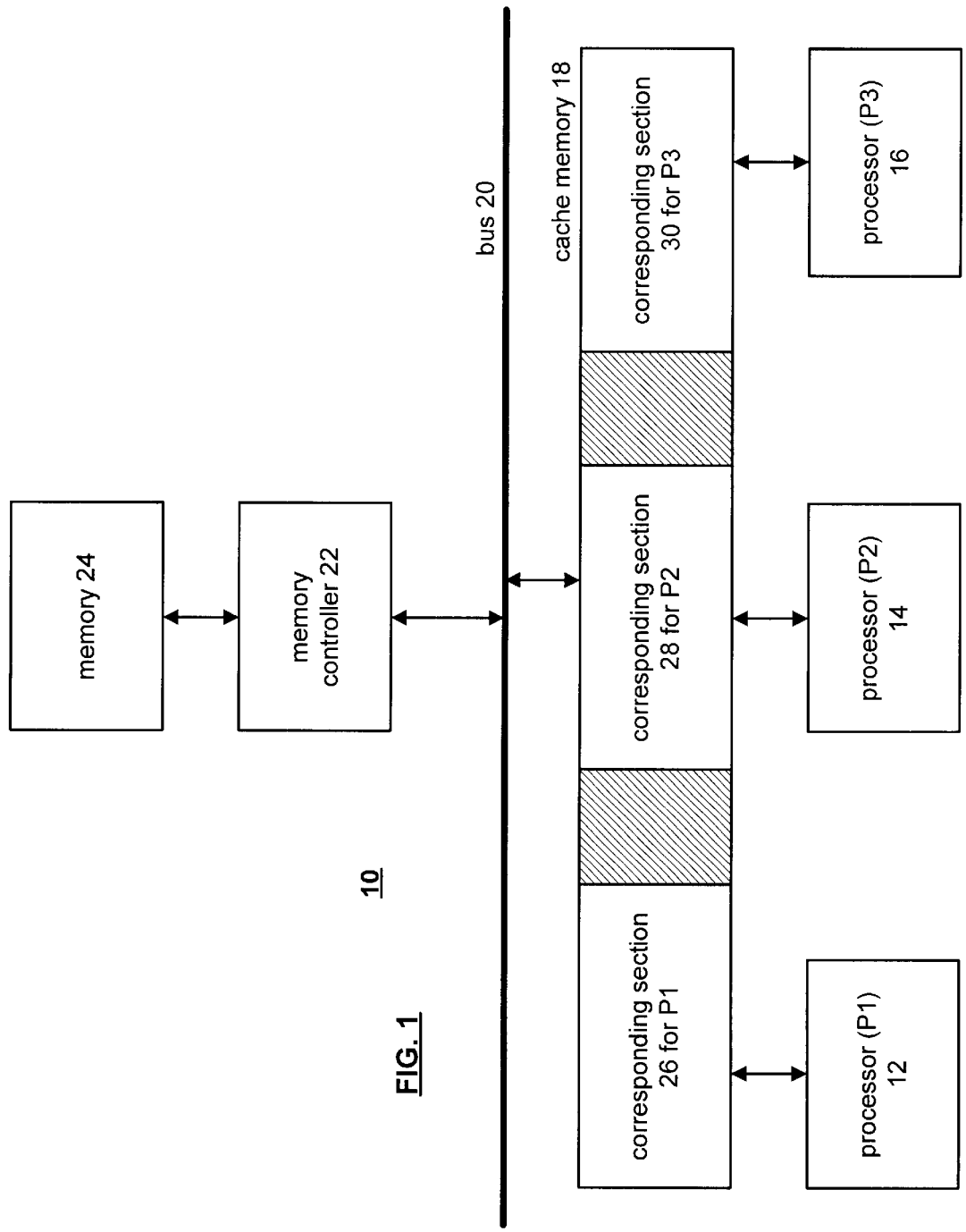
FIG. 1 illustrates a schematic block diagram of a computing system in accordance with the present invention.

The present invention can be more fully described with reference to FIGS. 1 through 9. FIG. 1 illustrates a schematic block diagram of computing system 10 that includes a plurality of processors 12–16, cache memory 18, a bus 20, a memory controller 22 and memory 24. The processors 12–16 may collectively be a single processing device, may be individual processing devices, or may each include a plurality of processing devices. Such a processing device may be a microprocessor, microcontroller, digital signal processor, state machine, logic circuitry, microcomputer, portion of a central processing unit and/or any other device that manipulates signals (e.g., analog or digital) based on operational instructions. The memory 24 may be a single memory device or a plurality of memory devices. Such a memory device may be a read-only memory, random access memory, floppy disk memory, hard drive memory, magnetic tape memory, and/or any other device that stores operational instructions. Note that if a processor 12–16 implements one or more of its functions via a state machine or logic circuitry, the memory storing the corresponding instructions is embedded within the circuitry comprising the state machine and/or logic circuitry.

In general, each of the processors 12–16 is operably coupled to the cache memory 18. In accordance with an embodiment of the present invention, each of the processors has a corresponding section 26–30 of the cache memory 18 allocated thereto. Depending on the cache requirements of the processors, the corresponding sections 26–30 are dynamically allocated. As such, when one processor requires additional cache memory, and another processor is not utilizing its allocated cache memory, the available cache memory may be dynamically reallocated to the other processors. As such, one processor may be allocated all of cache memory 18 while the other processors have none. Conversely, the cache memory may be equally allocated to each of the processors based on their cache requirements.

Determination of the cache requirements for a particular processor is dependent on the current applications being performed by the processors. For example, if one of the processors is performing a video graphics function which requires a substantial amount of reading and writing of data from and to the memory 24, while another processor is performing a word application, which has substantially less read/write interaction with memory 24, the processor performing the video graphics function would be dynamically allocated more of cache memory 18 than the processor performing the word application. As one of average skill in the art would appreciate, the dynamic allocation of cache memory 18 to the processors may vary dramatically based on the applications being performed by the processors. Accordingly, the dynamic allocation of the cache memory 18 to the processors is as varied as the applications which may be performed by the plurality of processors. Alternatively, one or more processors may be designated as having available cache for reallocation, and such a designation may be based on a round robin selection, or other identifying technique. As yet another alternative, the processors may communicate with each other to identify one or more processors having available cache. As a further alternative, the memory controller 22 may determine which processor has available cache for reallocation and which processor requires addition cache. Such a memory controller determination may be based on frequency of memory access requests by a processor, a poling of the processors, or any manner in which the memory controller 22 may obtain a processors cache memory requirements.

The memory-controller 22 processes read/write commands to and from memory 24 for the processors 12–16. The commands are received via a control portion of bus 20 and processed by the memory controller 22 in any suitable manner known within the art. Note that bus 20 may be a pipelined, split transaction, fixed latency bus. The use of the bus 20 will be discussed in greater detail with reference to FIGS. 6 through 9.

Figure 2:
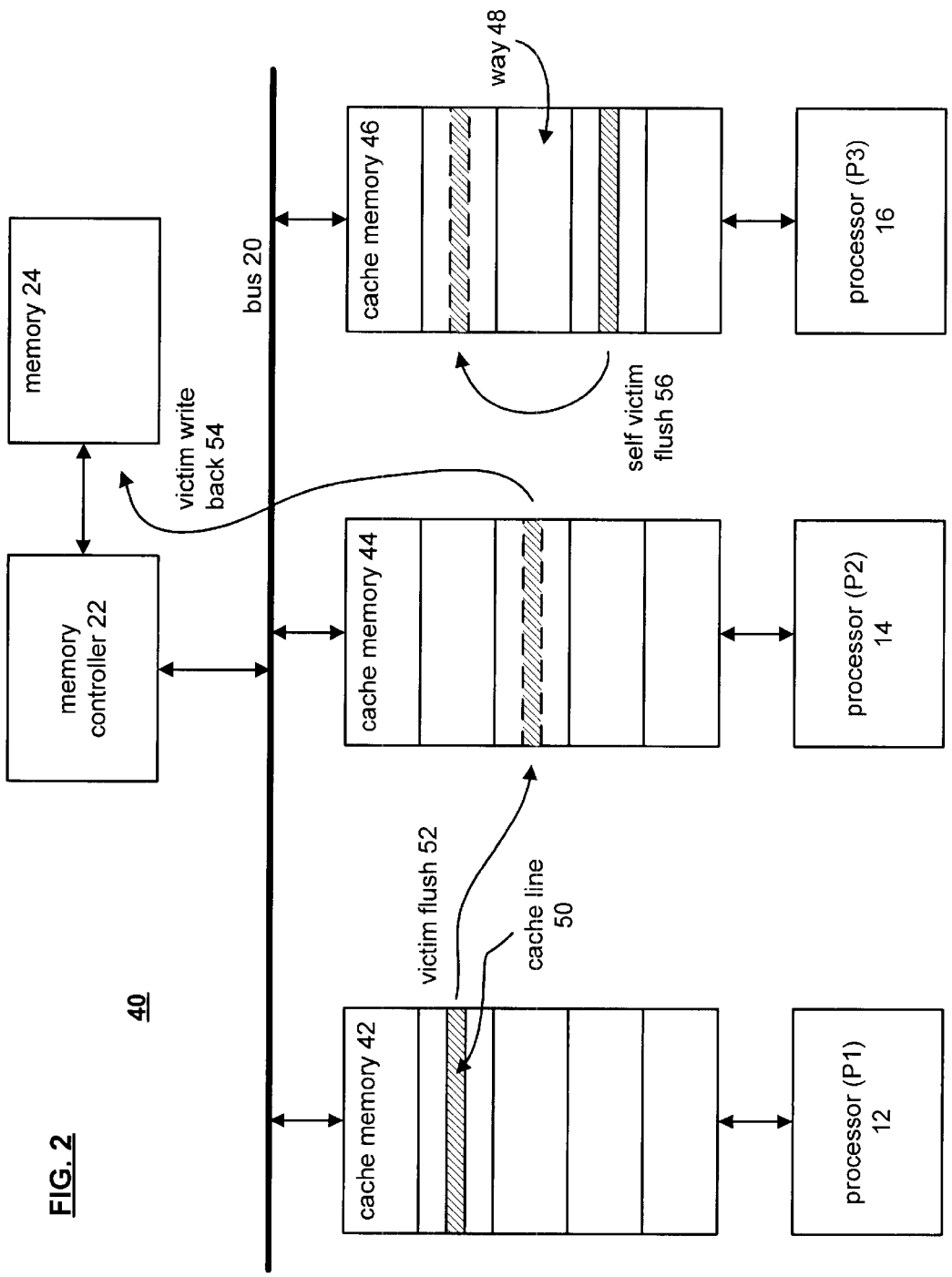
FIG. 2 illustrates a graphical illustration of sharing cache between a plurality of processors in accordance with the present invention.

FIG. 2 illustrates a computer system 40 that includes the processors 12–16, the bus 20, the memory controller 22, the memory 24 and a plurality of cache memories 42–46. As shown, each of the cache memories 42–46 is operably coupled to a corresponding one of the processors 12–16. Each cache memory 42–46 includes a plurality of ways 48. As is known, a cache memory way 48 corresponds with a line and/or block of data of memory 24. As such, when a memory fill is processed from memory 24, the line or block of data is retrieved from memory 24 and stored in the corresponding way 48 of the cache memory 42–46.

FIG. 2 further illustrates a graphical representation of the cache memories 42–46 being shared by the processors. In the graphical representation, processor 12 has a cache line 50 which it desires to flush, i.e., write back to memory 24. In this embodiment, the cache line 50 will be flushed, via a victim flush 52 to cache memory 44, which is functioning as a second level cache for processor 12. For this illustration, processor 14 was identified as having available cache memory for allocation to one or more of the other processors. As previously mentioned, such a determination may be based on cache requirements of the processors. An alternative victim flush may be achieved by swapping a cache line from cache memory 42 with a cache line from cache memory 44.

While processor 14 has been designated as having available memory for allocation to other processors, it still determines whether it can accept a victim flush operation. In this illustration, the victim flush 52 is accepted. Accordingly, the cache line 50 is flushed from cache memory 42 to cache memory 44. Note that in the illustration in FIG. 2, the cache line 50 of memory 42 is in a different way than the flushed cache line in cache memory 44. Accordingly, each processor treats its cache memory on a way by way basis. As such, any way may be used for as a second level cache for another processor. Note that if processor 14 is unable to accept the victim flush, i.e., it needs its memory, it generates a miss signal.

If a miss signal is generated in response to a victim flush, the memory controller 22 receives the miss signal and determines whether cache line 50 has been modified. If it has been modified (i.e., the dirty bit is set), the memory controller 22 allows a flush of the cache line 50 to memory 24. If the cache line 50 has not been modified, the memory controller 22 ignores the flush operation.

When the cache line transferred to cache memory 44 is no longer needed, i.e., because another victim flush has been requested, the cache line is flushed, via a victim write back operation to memory 24. If the cache line that is replaced by the victim flush in cache memory 44 is dirty, then that line is flushed to memory. Accordingly, processor 12 may retrieve the cache line from cache memory 44 any time prior to a victim write-back 54. Thus, the sharing of cache by many processors is more efficient use of cache than each processor having its own, dedicated, cache.

FIG. 2 further illustrates a self-victim flush 56, where a cache line of data is flushed from one way to another within the same cache memory 46. In this illustration, it is assumed that cache memory 46 has available memory for reallocation. As such, when processor 16 has data to flush, it determines that its cache memory is functioning as the second level cache for the processors. Accordingly, processor 16 flushes the cache line from one way of its cache to another way of its cache. Such a flush may be referred to as a self-victim flush 56. Note that a self-victim flush, or a victim flush, may be flushing data from the instruction cache to the data cache, or vice versa.

Figure 3:
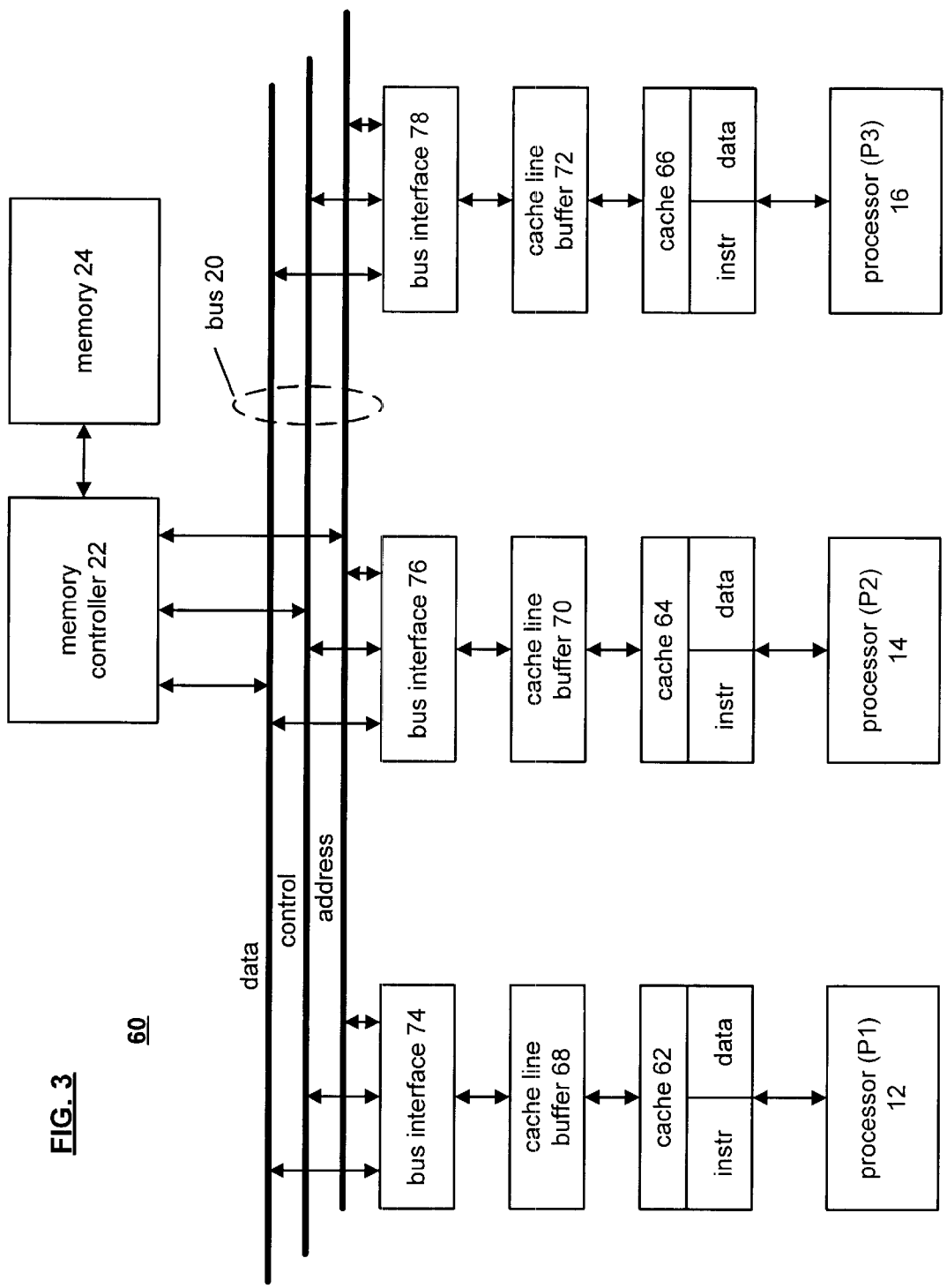
FIG. 3 illustrates a more detailed schematic block diagram of a computing system in accordance with the present invention.

FIG. 3 illustrates a computing system 60 that includes a plurality of processors 12–16, the bus 20, the memory controller 22, the memory 24, a plurality of caches 62–66, a cache line buffer 68–72 and bus interfaces 74–78. As shown, each cache 62–66 includes an instruction portion and a data portion. The bus interfaces 74–78 may include a processing module which may be a single processing device as previously described or a plurality of processing devices, and memory, which may be a single memory device or a plurality of memory devices as previously described.

The bus 20 includes a data bus, a control bus and an address bus that are each utilized in a pipe-lined manner to produce a pipeline, split transaction, fixed latency bus that couples the caches to the memory and processors. The operation of computer system 60, with respect to the present invention is similar to the discussions of computer system 10 and computer system 40 of FIGS. 1 and 2.

Figure 4:
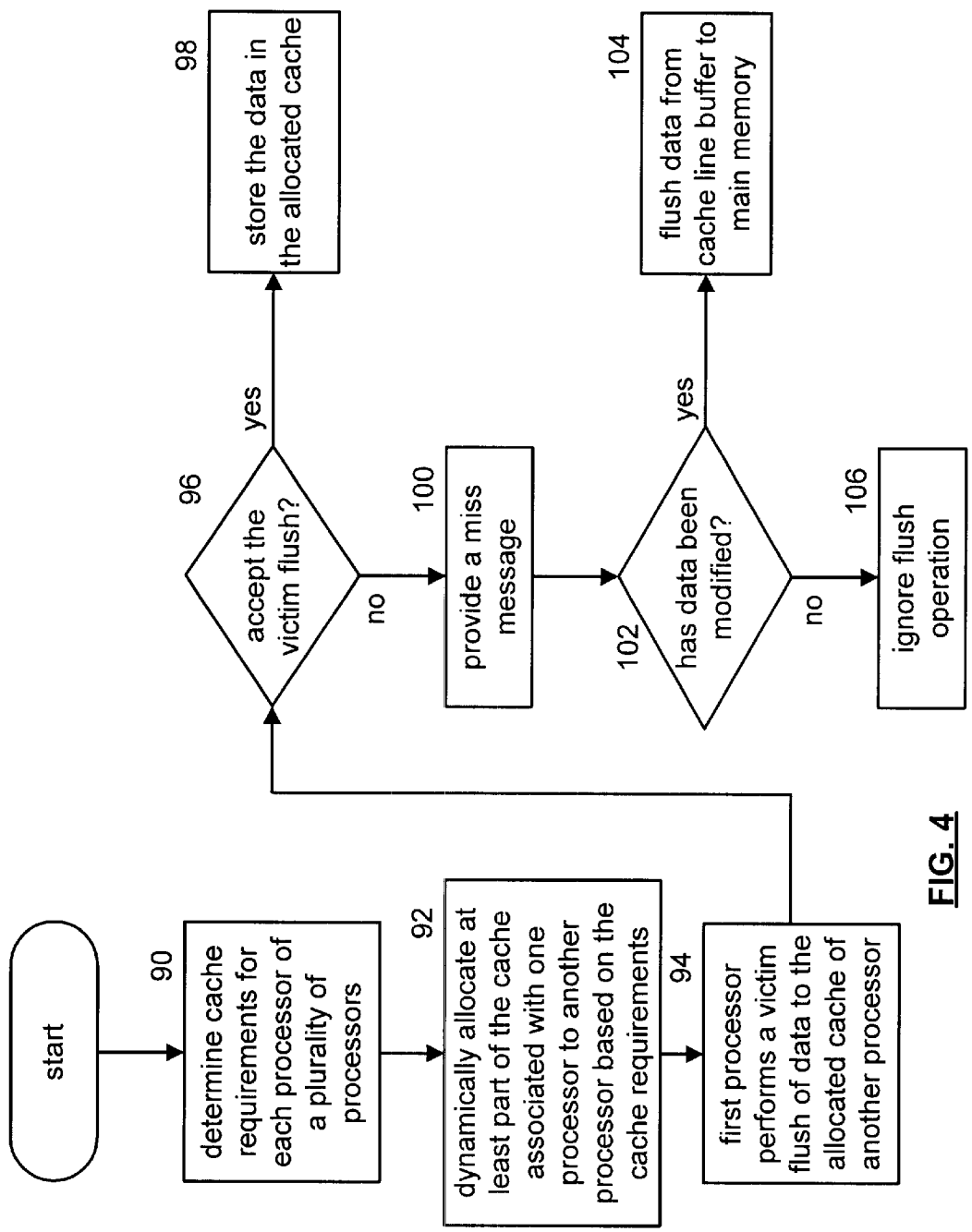
FIG. 4 illustrates a logic diagram of a method for sharing cache in accordance with the present invention.

FIG. 4 illustrates a logic diagram of a method for sharing cache memory in accordance with the present invention, which may be performed by one or more processing modules within the computing system 10, 40, or 60. The process begins at step 90 where cache requirements are determined for each processor of a plurality of processors. Each of the processors may be associated with a corresponding cache or a corresponding section of a cache. The process then proceeds to step 92 where at least a part of the cache associated with one processor is dynamically allocated to another processor based on the cache requirements. The cache requirements were previously discussed.

The process then proceeds to step 94 where a first processor performs a victim flush of data from its cache to the allocated cache of the other processor. Alternatively, the processor may perform a self-victim flush wherein the data is flushed from one way of its cache to another way. Note that the way may be associated with the instruction cache portion or the data cache portion. The process then proceeds to step 96 where the other processor determines whether it can accept the victim flush. If so, the process proceeds to step 98 where the other processor stores the data in the allocated cache.

If the victim flush cannot be accepted, the process proceeds to step 100. At step 100, the other processor provides a miss message. The processes then proceeds to step 102 where the memory controller, in response to the miss message, determines whether the cache line of data has been modified, i.e., determines whether the dirty bit for the cache line is set. If the data has not been modified, the process proceeds to step 106 where the flush operation is ignored. If, however, the data has been modified, the process proceeds to step 104 where the data is flushed from the cache line buffer to main memory.

Figure 5:
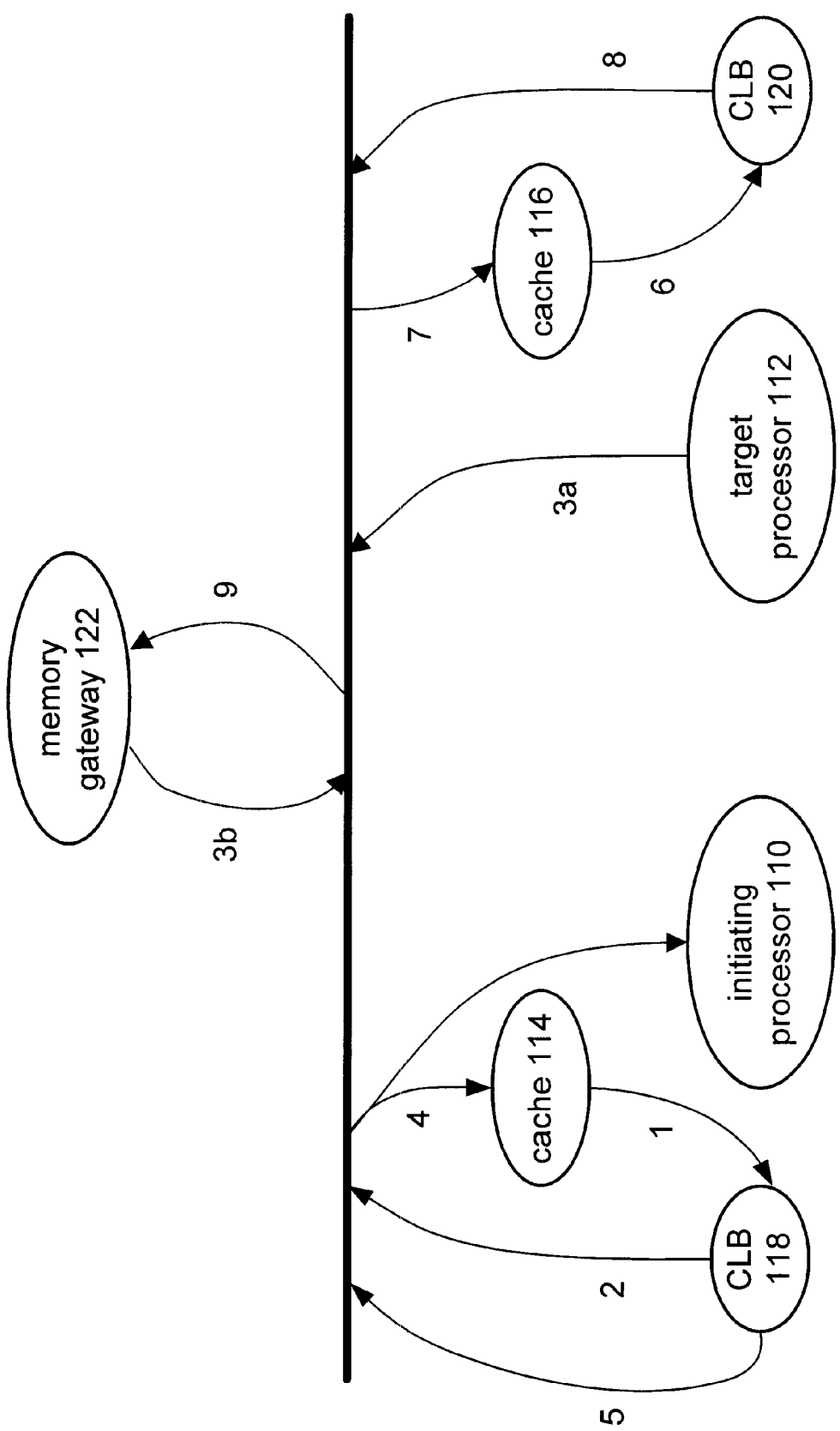
FIG. 5 illustrates a state diagram of shared cache transactions in accordance with the present invention.

FIG. 5 illustrates a state diagram of sharing cache memory in accordance with the present invention. In the state diagram, the states include the initiating processor 110, the target processor 112, cache 114, cache 116, cache line buffer 118, cache line buffer 120 and memory gateway 122. The numbers corresponding with the arrows designates the processing sequence of a particular data command, which starts with a miss in the first level cache. Accordingly, the first step is a determination of whether an existing line at the cache 114 is valid. If so, the initiating processor 110 causes the line of data to be transferred to the cache line buffer. Next, the initiating processor 110 makes a request on the bus to the other processors for the data. If the requested data resides in another processor's cache, i.e., it's a level two hit, the targeted processor 112 provides the data to the initiating processor. If, however, the data does not reside in the cache of the target processor 112, the memory gateway 122 accepts the request. The memory gateway 122 then fetches the data from the main memory and provides it to the initiating processor.

At operation 4, the initiating processor 110 accepts this data and forwards it to the pipeline bus and writes it into its level 1 cache 114. At operation 5, the initiating processor 110 initiates another transaction if the line that is replaced (i.e., the victim line) needs to be sent to another processor. At this point the target processor 112 is selected based on a processor identifying algorithm such as a least recently used processor. As such, the level 2 memory associated with a particular processor may be determined based on the processor that least recently used its memory.

At operation 6, the target processor 112 determines whether the line that will be replaced is dirty (i.e., has been modified). If so, the target processor writes the data into its cache line buffer 120. At operation 7, the target processor 112 accepts the victim data and writes it into its cache 116. At operation 8, if the cache line in the target processor was dirty the target processor initiates a write back of the data to the memory gateway 122. At operation 9, the memory gateway accepts this line of data and writes it to memory.

FIG. 6 illustrates a graphical representation of the pipeline operation of bus 20. In this illustration, three transactions are being pipelined over 7 bus cycles. Note that the bus cycle length may be a single clock cycle or a plurality of clock cycles but will be fixed for each particular type of operation. As such, for providing control signaling, the first bus cycle will be of a fixed duration (i.e., one or more clock cycles). The same is true for each of the other operations that occur for each transaction in the pipeline process.

During the first bus cycle for the first transaction, first control signaling is provided. Such control signaling may correspond to an arbitration phase for access to the bus. In one embodiment, a distributed arbitration may be used such that the processors may determine which processor has access to the bus next, and which processor has had the most recent access to the bus. Each processor makes such determination on its own.

During the second bus cycle, a first addressing signal for the first transaction is provided on the bus as well as second control signaling for the second transaction. The address signaling corresponds to the physical address of the data element requested, which is provided by the processor. During the third bus cycle, the other processors are determining, for the first transaction, whether they have the requested data. Also during the third bus cycle, the second transaction is providing second addressing signals which corresponds to the physical address of data being requested by the processors supporting the second transaction. In addition, a processor is providing a third control signaling for the third transaction. Note that the first, second and third transactions may be performed by the same processor or different processors.

During the fourth bus cycle, a first status is provided for the first transaction. The first status corresponds to a hit message, a miss message or a retry message. The hit message is provided by one of the processors when it has the requested data in its cache. The miss message indicates that none of the other processors have the data stored in its cache. The retry message indicates that one or more of the processors were unable to determine whether its cache includes the data. Also during the fourth bus cycle, the other processors are determining whether they have the requested data for the second transaction. Further, during the fourth bus cycle, the processor supporting the third transaction provides address signaling for the third transaction.

During the fifth bus cycle, the processor supporting the first transaction is reading the data, assuming the first status was a hit. Also during the fifth bus cycle, the other processors are providing status information for the second transaction and are determining whether they have the requested data for the third transaction.

During the sixth bus cycle, the processor having the data of the first transaction is providing data onto the bus. If multiple processors have the data, one of the processors (based on a predetermined algorithm) chooses to provide the data. The processor supporting the second transaction reads the data from one of the other processors assuming the second status was a hit, while the processor supporting the third transaction is receiving status information from the other processors. During the seventh bus cycle, the processor supporting the first transaction reads the data from the bus into its cache. Also during the seventh bus cycle, the data corresponding to the second transaction is provided on the data bus and the other processors are determining whether they have the requested data for the third transaction. After the seventh bus cycle, another transaction may commence in the pipeline position of the first transaction.

FIG. 7 illustrates the pipelined processing of multiple transactions in accordance with the present invention. In this illustration, in comparison of the illustration of FIG. 6, the other processors at the fifth bus cycle for the first transaction has each provided a miss message. As such, the data being requested by the processor supporting the first transaction must be retrieved from the external memory. When this happens, the pipeline processing may be split such that another transaction may commence during the sixth and subsequent bus cycles.

FIG. 8 illustrates a logic diagram of a method for busing data elements in accordance with the present invention, which may be performed by one or more of the processing modules of the computing system 10, 40, or 60. The process begins at step 120 where a first control signaling is provided on a shared bus in a first bus cycle. Note that the control signaling corresponds to bus arbitration. The process then proceeds to step 122 where a second control signaling and a first address signaling are provided on the shared bus in a second bus cycle. The process then proceeds to step 124 where, during a third bus cycle, third control signaling and second address signaling are provided on the shared bus. In addition, the other processors (i.e., the processors not supporting the corresponding transaction) determine whether their cache includes the requested data for the first transaction.

The process then proceeds to step 126 where first status and third addressing signals are provided on the shared bus in a fourth cycle. Note that the status comprises at least one of a hit indicator, a miss indicator, and a retry indicator. The process then proceeds to step 128 where, during a fifth bus cycle, if one of the other processors provided a hit message, the processor reads the requested data from its cache based on the first address signaling. The process then proceeds to step 130 where third status is provided on the shared bus during a sixth bus cycle. Note that if the status for the first transaction was a miss, during the sixth bus cycle the first transaction may be split indicating that the data must be retrieved from external memory during subsequent bus cycles. In addition, the sixth and subsequent bus cycles may be utilized for busing a data element of another transaction. Further note that if the status for the first transaction was a retry indicator, the processor supporting the first transaction would re-provide the first control signaling related to the first transaction in a bus cycle subsequent to receiving the first status. The process then proceeds to step 132 where the first data is provided on the shared bus to the processors supporting the first transaction during a seventh bus cycle.

Figure 9:
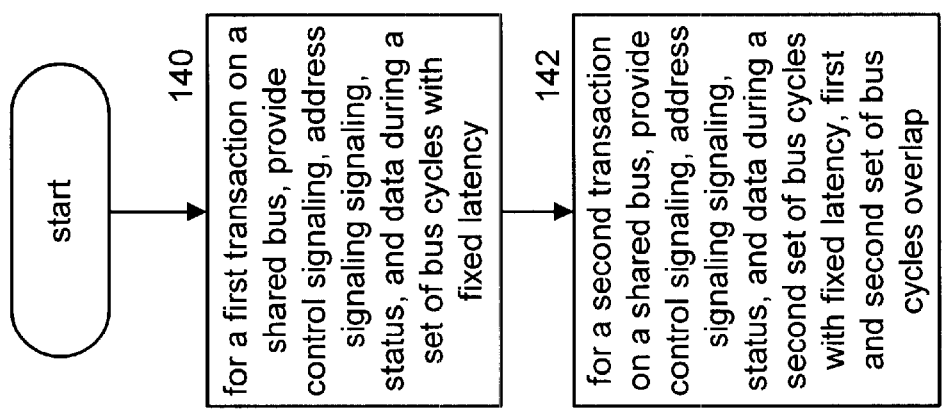
FIG. 9 illustrates a logic diagram of an alternate method for busing data elements in accordance with the present invention.

FIG. 9 illustrates a logic diagram of an alternate method for busing data elements in accordance with the present invention. The process begins at step 140 where, for a first transaction on a shared bus control signaling, address signaling, status and data are provided during a set of bus cycles with a fixed latency. This was illustrated with reference to FIG. 6. The process then proceeds to step 142 for a second transaction on the shared bus, control signaling, address signaling, status, and data are provided during a second set of bus cycles with a fixed latency wherein the first and second bus cycles overlap. This was illustrated in reference to FIG. 6.

The preceding discussion has presented a method and apparatus for sharing memory within a computing system and for transporting data elements via a pipelined fixed latency, low latency bus. As such, memory is more efficiently utilized and data is more efficiently transported than in previous computer architectures. As one of average skill in the art would appreciate, other embodiments may be derived from the teachings of the present invention without deviating from the scope of the claims or the spirit of the invention.

What is claimed is:

1. A method for busing data elements, the method comprises the steps of:

a) providing, on a shared bus, first control signaling relating to a first transaction in a first bus cycle;

b) providing, on the shared bus, second control signaling relating to a second transaction and first address signaling relating to the first transaction in a second bus cycle;

c) providing, on the shared bus, third control signaling relating to a third transaction and second address signaling relating to the second transaction in a third bus cycle, and determining by at least one processor coupled to the shared bus whether cache associated with the at least one processor includes data identified by the first address signaling;

d) providing, on the shared bus, first status relating to the first transaction and third address signaling relating to the third transaction in a fourth bus cycle;

e) providing, on the shared bus, second status relating to the second transaction in a fifth bus cycle and reading by the at least one processor the data from the cache when the at least one processor determined that the cache includes the data;

f) providing, on the shared bus, first data relating to the first transaction when the first status is a hit; and g) providing, on the shared bus, third status relating to the third transaction in the sixth bus cycle.

2. The method of claim 1, wherein the first, second, and third control signaling corresponds to bus arbitration.

3. The method of claim 1, wherein the status comprises at least one of a hit indicator, a miss indicator, and a retry indicator.

4. The method of claim 1 further comprises, during a seventh bus cycle, writing, by a requesting processor, the data into cache associated with the requesting processor, wherein the requesting processor is associated with the first transaction.

5. The method of claim 3 further comprises, when the status includes the miss indicator:

splitting the first transaction, such that the data is retrieved from external memory during a subsequent bus cycle; and utilizing bus cycles between the sixth bus cycle and the subsequent bus cycle for busing a data element of at least one other transaction.

6. The method of claim 3 further comprises, when the status is the retry indicator, re-providing the first control signaling relating to the first transaction in a bus cycle subsequent to the fourth bus cycle.

7. A method for busing data elements, the method comprises the steps of:
   a) providing, for a first transaction on a shared bus, control signaling, address signaling, status, and data on a shared bus during a set of bus cycles, wherein the control signaling, the address signaling, the status, and the data have, with respect to each other, a fixed latency; and
   b) providing, for a second transaction on the shared bus, second control signaling, second address signaling, second status, and second data on the shared bus during a second set of bus cycles, wherein the second control signaling, the second address signaling, the second status, and the second data have, with respect to each other, the fixed latency, wherein the second set of bus cycles overlaps the set of bus cycles such that the first and second transactions are provided on the shared bus in a pipelined manner, wherein the status comprise at least one of a hit indicator, a miss indicator, and a retry indicator; and
   when the status is the retry indicator, re-providing the first control signaling relating to the first transaction in a bus cycle subsequent to interpreting of the status.

8. The method of claim 7, wherein the first transaction further comprises a fixed number of wait cycles for reading tags associated with the first transaction, a fixed number of wait cycles for reading data from a cache location, and a fixed number of wait cycles for writing the data to another cache location.

9. The method of claim 7, wherein, for the first transaction, the address signaling occurs in a first predetermined number of bus cycles after the control signaling, the status occurs in a second predetermined number of bus cycles after the address signaling, and the data occurs in a third predetermined number of bus cycles after the status.

10. The method of claim 7, wherein the each of the first, second, and third predetermined number of bus cycles includes one to four bus cycles.

11. The method of claim 7 further comprises, providing data relating to the first transaction when the status for the first transaction includes a hit indicator.

12. The method of claim 7 further comprises, when the status for the first transaction includes the miss indicator:
   splitting the first transaction, such that the data is retrieved from external memory during a subsequent bus cycle; and
   utilizing bus cycles after the status has been interpreted and the subsequent bus cycle for busing a data element of at least one other transaction.

13. A bus manager comprises:
   a shared bus;
   a processing module; and
   memory operably coupled to the processing module, wherein the memory stores operational instructions that cause the processing module to(a) enable providing of, on the shared bus, first control signaling-relating to a first transaction in a first bus cycle; (b) enable providing of, on the shared bus, second control signaling relating to a second transaction and first address signaling relating to the first transaction in a second bus cycle; (c) enable providing of, on the shared bus, third control signaling relating to a third transaction and second address signaling relating to the second transaction and determine whether cache includes data identified by the first address signaling in a third bus cycle; (d) enable providing of, on the shared bus, first status relating to the first transaction and third address signaling relating to the third transaction in a fourth bus cycle; (e) enable providing of, on the shared bus, second status relating to the second transaction and reading of data from the cache in a fifth bus cycle; (f) enable providing of, on the shared bus, first data relating to the first transaction when the first status is a hit; and (g) enable providing of, on the shared bus, third status relating to the third transaction in the sixth bus cycle.

14. The bus manager of claim 13, wherein the first, second, and third control signaling corresponds to bus arbitration.

15. The bus manager of claim 13, wherein the status comprises at least one of a hit indicator, a miss indicator, and a retry indicator.

16. The bus manager of claim 13, wherein the memory further comprises operational instructions that cause the processing module to, during a seventh bus cycle, write the data into another cache associated with the first transaction.

17. The bus manager of claim 15, wherein the memory further comprises operational instructions that cause the processing module to, when the status includes the miss indicator:
   split the first transaction, such that the data is retrieved from external memory during a subsequent bus cycle; and
   utilize bus cycles between the sixth bus cycle and the subsequent bus cycle for busing a data element of at least one other transaction.

18. The bus manager of claim 15, wherein the memory further comprises operational instructions that cause the processing module to, when the status is the retry indicator, re-provide the first control signaling relating to the first transaction in a bus cycle subsequent to the fourth bus cycle.

19. A bus manager comprises:
   a shared bus;
   a processing module; and
   memory operably coupled to the processing module, wherein the memory stores operational instructions that cause the processing module to (a) provide, for a first transaction on the shared bus, control signaling, address signaling, status, and data on a shared bus during a set of bus cycles, wherein the control signaling, the address signaling, the status, and the data have, with respect to each other, a fixed latency; and (b) provide, for a second transaction on the shared bus, second control signaling, second address signaling, second status, and second data on the shared bus during a second set of bus cycles, wherein the second control signaling, the second address signaling, the second status, and the second data have, with respect to each other, the fixed latency, wherein the second set of bus cycles overlaps the set of bus cycles such that the first and second transactions are provided on the shared bus in a pipelined manner, wherein the status comprises at least one of a hit indicator, a miss indicator, and a retry indicator, and when the status is the retry indicator, re-provide the first control signaling relating to the first transaction in a bus cycle subsequent to interpreting of the status.

20. The bus manger of claim 19, wherein the first transaction further comprises a fixed number of wait cycles for reading tags associated with the first transaction, a fixed number of wait cycles for reading data from a cache location, and a fixed number of wait cycles for writing the data to another cache location.

21. The bus manager of claim 19, wherein, for the first transaction, the address signaling occurs in a first predetermined number of bus cycles after the control signaling, the status occurs in a second predetermined number of bus cycles after the address signaling, and the data occurs in a third predetermined number of bus cycles after the status.

22. The bus manager of claim 19, wherein the each of the first, second, and third predetermined number of bus cycles includes one to four bus cycles.

23. The bus manager of claim 19, wherein the memory further comprises operational instructions that cause the processing module to, when the status for the first transaction includes the miss indicator:

split the first transaction, such that the data is retrieved from external memory during a subsequent bus cycle; and utilize bus cycles after the status has been interpreted and the subsequent bus cycle for busing a data element of at least one other transaction.

24. The bus manager of claim 19, wherein the memory further comprises operational instructions that cause the processing module to, when the status is the hit indicator, provide data relating to the first transaction in a bus cycle subsequent to interpreting of the status.

* * * * *